United States Patent [19]

Burch et al.

[11] 4,018,409

[45] Apr. 19, 1977

[54] COMBINED DOCKING AND GRASPING DEVICE

[75] Inventors: John L. Burch, Decatur; James D. Johnston, Madison, both of Ala.

[73] Assignee: The United States of America as represented by the Administrator of the National Aeronautics and Space Administration, Washington, D.C.

[22] Filed: Aug. 7, 1975

[21] Appl. No.: 602,617

[52] U.S. Cl. .............................. 244/161; 213/81; 214/1 CM

[51] Int. Cl.² ......................................... B64G 1/00

[58] Field of Search ................. 244/161, 2, 135 A; 294/97; 214/1 CM; 213/81, 92, 101, 177, 186

[56] References Cited

UNITED STATES PATENTS 3,268,091  8/1966  Melton .......................... 244/161 X
3,401,903  9/1968  Bohr ............................. 244/161 X

*Primary Examiner*—Trygve M. Blix
*Assistant Examiner*—Barry L. Kelmachter
*Attorney, Agent, or Firm*—L. D. Wofford, Jr.; John R. Manning

[57] ABSTRACT

A combined docking and grasping device for use with a manipulator arm on a docking vehicle and the like for mechanically connecting a docking vehicle with an orbital payload having a receptacle for receiving the device therein.

The device includes a pair of opposing jaw members having opposing serrated surfaces for grasping an object and a triangular cam portion on an outer surface for insertion and interlocking with an orbital payload.

11 Claims, 4 Drawing Figures

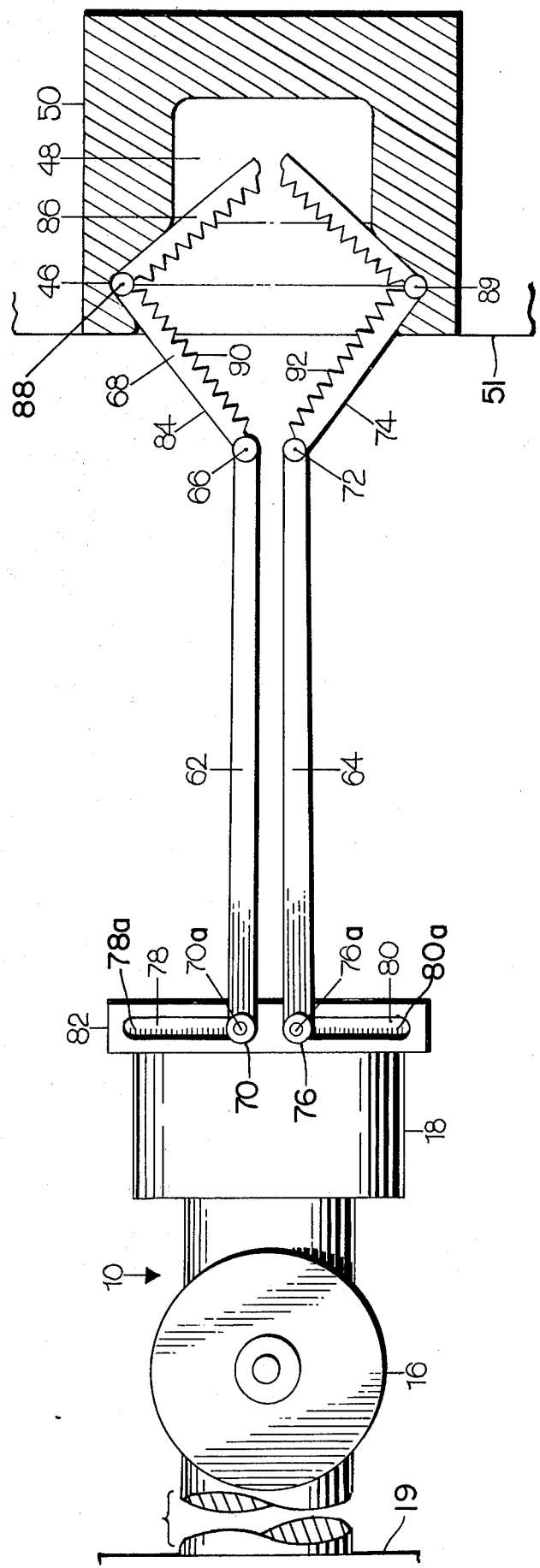
fig. A

COMBINED DOCKING AND GRASPING DEVICE

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

This invention relates to a combined docking and grasping manipulator arm device wherein a single manipulator arm can be used for both docking and for performing general useful work between orbital vehicles and orbital payloads. Heretofore, many manipulator arm devices have included separate mechanisms for docking and performing general useful work such as changing out modules on an orbiting satellite. Prior designs have limited the performance of a single manipulator arm mechanism to one function of the other. This requires that the effector device located on the end of the manipulator arm be changed out from one device to the other depending on whether docking or general work is being carried out by the orbital vehicle.

Devices have been developed for lifting up objects by either grasping around the object or insertion into the object such as shown in U.S. Pat. No. 485,944. While these devices may operate satisfactorily for the intended purpose, it can be seen that such devices do not possess the sophistication required for carrying out docking maneuvers as well as general purpose work between an orbital vehicle and an orbital payload wherein specialized docking and grasping devices are required which can be controlled with much precision and accuracy.

SUMMARY OF THE INVENTION

A combined docking and grasping device for use with a manipulator arm on a docking vehicle and the like is provided for mechanically connecting together the docking vehicle with a docking payload having a receptacle for receiving the device therein. The manipulator arm includes a conventional mechanical wrist joint having a pair of rotatable axes providing the arm with movement about two perpendicular axes. The device comprises a pair of jaw members movable towards each other and away from each other to a spread apart configuration, and an elongated linkage assembly connecting each of the jaw members to the wrist joint. Means are carried adjacent the wrist joint for moving the elongated assembly causing the jaw members to move towards and away from each other. Each of the jaw members has an interface surface enabling the jaw members to grip an object securely between the surfaces. A cam portion is formed on an upper surface of each of the jaw members for engaging a receiving portion formed within the receptacle when the jaw members are in a spread apart condition to interlock the docking vehicle and docking payload together. Thus, the manipulator arm may be selectively utilized either as a docking device or as a general purpose grasping device to pick up an object.

Accordingly, it is an important object of the present invention to provide a combined docking and grasping device for use with a manipulator arm on a docking vehicle and the like.

Still another important object of the present invention is to provide a single device which can be effectively utilized to reach around objects for picking them up as well as for insertion into a receptacle carried on an orbiting payload for interlocking therein.

Still another important object of the present invention is to provide a combined docking and grasping device for use with a manipulator arm on a docking vehicle which is small and compact and can be easily stored thereon.

Still another important object of the present invention is to provide a combined docking and grasping device for use with a manipulator arm wherein the device may be highly adjustable so as to reach around a variety of payload sizes.

Still another important object of the present invention is to provide a combined docking and grasping device for use with a manipulator arm which is self-centering when inserted into a receptacle on an orbital payload.

These and other objects and advantages of the invention will become apparent upon reference to the following specification, attendant claims, and drawing.

BRIEF DESCRIPTION OF THE DRAWING

FIG. 4 is a side elevational view illustrating an alternate embodiment of a combined docking and grasping device constructed in accordance with the present invention.

DESCRIPTION OF A PREFERRED EMBODIMENT

Figure 1:
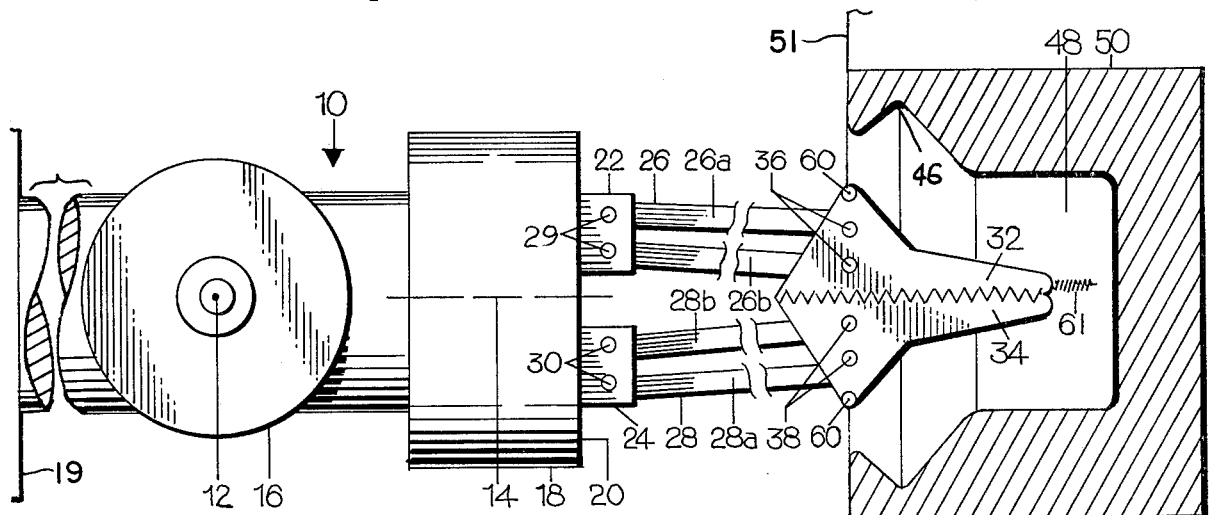
FIG. 1 is a side elevational view illustrating a combined docking and grasping device for use with a manipulator arm constructed in accordance with the present invention being inserted in a receptacle for docking.

The apparatus of the present invention may be incorporated with any conventional mechanical manipulator arm such as utilized on space flight vehicles for docking and working with orbital payloads. A conventional manipulator arm usually terminates in a mechanical wrist joint designated generally as 10 having rotating axes at 12 and 14 providing the manipulator arm with rotational movement about the two perpendicular axes. The two axes 12 and 14 about which the wrist joint rotates are normally housed in cylindrical housings 16 and 18, respectively. An electric motor or other suitable driving means may be utilized within the cylindrical housing for rotating the wrist joint about the respective axes as controlled by the operator inside the vehicle 19 by remote control.

Carried on a base plate 20 of cylindrical housing 18 is a pair of spaced housings 22 and 24 which are connected to a pair of elongated linkage assemblies 26 and 28, respectively. The elongated linkage assemblies are connected to the respective housings by motorized pivot points 29 and 30. Carried on the other end of the elongated linkage assemblies 26 and 28 are a pair of jaw members 32 and 34. The jaw members 32 and 34 are moved towards and away from each other by any suitable conventional means such as by the motorized pivots 29 and 30 which transmit the motion to the jaw members through the elongated linkage assemblies 26 and 28. The motorized pivots 29 and 30 may be driven by small electric motors and suitable gear arrangements which are controlled by the operator utilizing remote controls. The jaw member 32 is connected to the elongated linkage assembly 26 utilizing any suitable pivot connection at 36, and jaw member 34 is connected at 38 to the elongated linkage assembly 28 in a like manner. Each of the elongated linkage assemblies 26 and 28 includes a pair of elongated members 26a, 26b, and 28a, 28b.

Each of the jaw members 32 and 34 include an interface surface 40 and 42, respectively, for gripping an object therebetween. Each of the interface surfaces 40 and 42 is serrated so as to enhance the gripping effect of the jaws.

Figure 2:
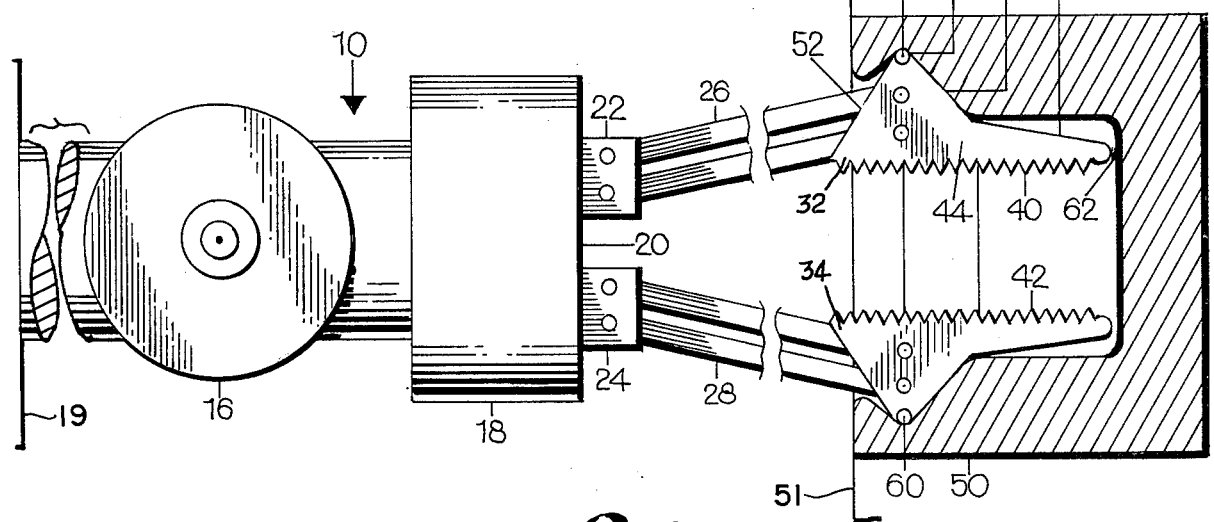
FIG. 2 is a side elevational view of a combined docking and grasping device constructed in accordance with the present invention illustrating the device inserted into a receptacle and moved to a spread apart configuration for interlocking the device in the receptacle.

Since the jaw members 32 and 34 are identical, only one of such jaws will be described in detail for purposes of illustration. Jaw member 32 includes a triangular cam portion 44 formed on an upper surface or back side thereof for engaging within a V-shaped groove 46 formed within an interior surface of an internal cavity 48 within the receptacle 50 carried within a payload vehicle 51. The V-shaped groove 46 extends around the entire internal periphery of the cavity 48 which is illustrated in FIGS. 1 and 2 in cross-section. The triangular cam portion 44 is defined by a triangular portion 52 sloping upwardly from one end of the interface surface 40 towards an apex 54. Thereafterwards the triangular portion slopes downward at 56 extending into an elongated portion 58 which terminates at the opposite end of the interface surface and provides an elongated bill member for each jaw member 32 and 34. At the apex of each jaw member 32 and 34 is a roller bearing 60 which aids in the jaw members being self-centered in the V-shaped groove 46 when the jaw members are moved to their spread apart configuration, as best seen in FIG. 2, for interlocking the jaw members within the receptacle 50. The receptacle 50 is preferably flush mounted within the orbital payload 51 which provides easier docking at a variety of approach angles.

A sensor means 61 is carried adjacent the end of jaw member 32 for sensing a desired depth of penetration of the jaw members within the cavity 48 to initiate the moving of the jaw members away from each other so as to interlock in the receptacle 50.

Figure 3:
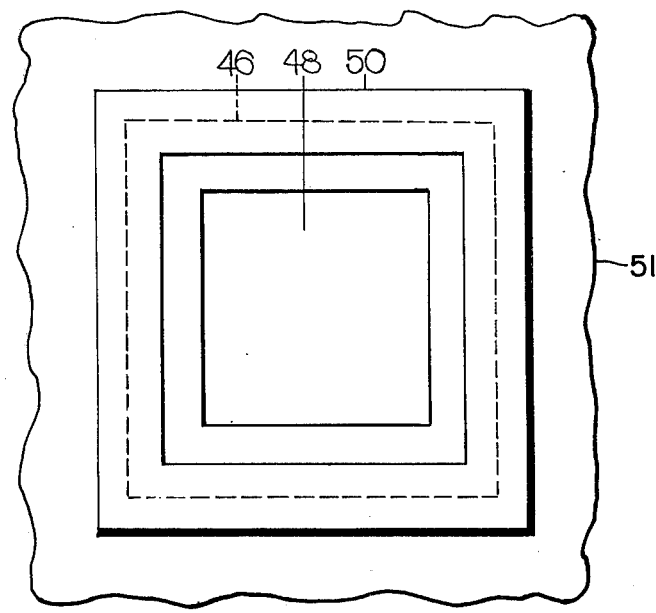
FIG. 3 is a front elevational view illustrating a receptacle which may be flush mounted in an orbiting payload for receiving the combined docking and grasping device constructed in accordance with the present invention.

In a preferred embodiment, the internal cavity 48 formed within the receptacle 50 is a substantially rectangular cross-section as illustrated in FIG. 3, and the jaw members 32 and 34 also have a substantially rectangular cross-section so as to interlock in the receptacle. Preferably the receptacle 50 is of substantially square cross-section and the width of the jaw members 32 and 34 is approximately equal to that of the square cross-section of the entrance to the receptacle cavity 48 so as to interlock in multiples of ninety degrees of rotation with respect to the internal cavity.

The jaw members 32 and 34 may also be provided with a longitudinal groove formed centrally along the entire length of each interface 40 and 42, respectively, for holding tools as tool adapters. Referring now to FIG. 4, an alternate embodiment of a docking and grasping device constructed in accordance with the present invention is illustrated wherein a pair of elongated members 62 and 64 are provided which are substantially longer than the elongated linkage assemblies 26 and 28 of FIGS. 1 and 2. The elongated member 62 has a first end 66 pivotally connected to a jaw member 68 and a second end 70 connected adjacent the cylindrical housing 18 of wrist joint 10. Likewise, the elongated member 64 has a first end 72 connected to a jaw member 74 and a second end 76 connected at the wrist joint. The ends 70 and 76 of the elongated members are carried in a pair of vertical elongated slots 78 and 80, respectively. The ends 70 and 76 move in the slots 78 and 80 in a straight line towards and away from each other so as to vary the displacement between the elongated members 62 and 64 enabling them to be extended around larger payloads for gripping the same. The ends 70 and 76 of the elongated members 62 and 64, respectively, may be provided with rotating axes 70a and 76a driven by small electric motors having a gear arrangment (not shown) which meshes with a longitudinal gear rack 78a and 80a or any other suitable means may be provided for moving the ends 70 and 76 up and down the slots 78 and 80. Suitable electronic controls may also be provided for controlling the movement of the ends 70 and 76 at a remote station. The elongated slots 78 and 80 are formed in a housing 82 which is carried by the cylindrical housing 18 for rotation therewith.

The jaw members 68 and 74 are identical and therefore only a single jaw member 68 will be described in detail. The jaw member 68 includes a first bar element 84 connected to the pivotable joint 66 and a second bar element 86 connected to the first bar element 84 at a pivotable joint 88. The pivotable joints 66 and 88 may be remotely controlled using small electric motors as is the pivoted joint 72 and the corresponding pivoting joint 89 of jaw member 74. The jaw members 68 and 74 so constructed may be advantageously utilized to reach around much larger payloads than the jaw member of FIGS. 1 and 2. The jaw members 68 and 74 may also be provided with serrated interface surfaces 90 and 92 so as to grip an object securely therebetween. The jaw members 68 and 74 may be controlled to pivot into the position shown in FIG. 4 wherein a triangular shape is provided having an apex formed at the pivoted joint 88 and 89 for fitting within the V-shaped groove 46 formed within the receptacle 50.

Thus, it can be seen that a highly versatile and advantageous docking and grasping device can be constructed in accordance with the invention wherein the elongated members 62 and 64 may be displaced away from each other and the corresponding jaw member 68 and 74 may be utilized to reach around progressively larger payloads while also being utilized for docking in an interlocking manner.

The combined docking and grasping device constructed in accordance with the present invention doubles the potential workload of a single manipulator arm on an orbital vehicle for many space mission profiles and increases their workload capabilities. For example, two devices could be used to take a large payload from the storage bay of the vehicle and place the payload into a launch position, perhaps twenty-five feet above the vehicle. One of the devices could then continue to hold and stabilize the payload in space while the other device could detach itself from the payload and act as a general working device to check out and replace the payload components as required. Many other applications could be had with the combined docking and grasping device of the present invention is unplanned or emergency type operations which could easily save a mission.

While a preferred embodiment of the invention has been described using specific terms, such description is for illustrative purposes only and it is to be understood that changes and variations may be made without departing from the spirit or scope of the following claims.

What is claimed is:

1. A combined docking and grasping device for use with a manipulator arm on a docking vehicle for mechanically connecting together the docking vehicle with a docking payload having a receptacle for receiving said device therein, said manipulator arm including a mechanical wrist joint having a pair of rotatable axes providing said arm with movement about two perpendicular axes, said device comprising:
   a. a pair of jaw members movable towards each other and away from each other to a spread apart configuration;
   b. an elongated linkage assembly connecting each of said jaw members to said wrist joint;
   c. means carried adjacent said wrist joint for moving said elongated assembly causing said jaw members to move towards and away from each other;
   d. each of said jaw members having an interface surface enabling said jaw members to grip an object securely between said surfaces; and
   e. a cam portion formed on an upper surface of each of said jaw members for engaging a receiving portion formed within said receptacle when said jaw members are in a spread apart condition to interlock said docking vehicle and docking payload together;
   whereby said manipulator arm may be selectively utilized either as a docking device or as a general purpose grasping device to pick up an object.

2. The apparatus of claim 1 wherein said cam portion includes a triangular portion sloping upwardly from one end of said interface surface towards an apex.

3. The apparatus of claim 2 wherein said triangular portion extends downwardly from said apex to form an extended elongated portion terminating opposite said one end of said interface surface.

4. The apparatus of claim 2 wherein a roller bearing is carried at said apex of said triangular cam portion to aid said cam portion in being centered in said receiving portion.

5. The apparatus of claim 1 wherein said receptacle includes an internal cavity formed therein receiving said jaw member therein.

6. The apparatus of claim 5 wherein said jaw members and said internal cavity are substantially rectangular in cross-section 7. The apparatus of claim 2 wherein said receptacle includes a substantially V-shaped groove formed around the periphery of said internal cavity for receiving said triangular cam portion when said jaw members are in said spread apart condition.

8. The apparatus of claim 1 wherein said interface surface is serrated for securely gripping an object between the jaw members.

9. The apparatus of claim 1 wherein said elongated linkage assembly includes a pair of elongated members having a first end connected to a jaw member and a second end connected to said wrist joint, and wherein the apparatus includes means for moving said second ends of said elongated members towards and away from each other so as to enable said jaw members carried on said first ends to reach around progressively larger payloads accordingly.

10. The apparatus of claim 5 wherein said jaw member includes a first element connected to said elongated linkage assembly and a second element connected to said first element at a pivoted joint thereof whereby said first and second elements may be pivoted relative to each other so as to grip around an object.

11. The apparatus of claim 10 wherein said cam portion includes said pivoted joint which defines an apex receivable in a V-shaped groove formed in an interior surface of said cavity.

* * * * *